(12) United States Patent  
Miller et al.

(10) Patent No.: US 11,308,471 B2  
(45) Date of Patent: Apr. 19, 2022

(54) AGGREGATED SESSION MANAGEMENT FOR TERMINAL DEVICES

(71) Applicant: NCR Corporation, Atlanta, GA (US)

(72) Inventors: Alexander (Sandy) Pearson Miller, Dundee (GB); Andrew Davis, Perth (GB); Christopher James Dunlop, Dundee (GB); Kevin MacDonald McKenzie, Dundee (GB)

(73) Assignee: NCR Corporation, Atlanta, GA (US)

( * ) Notice: Subject to any disclaimer, the term of this patent is extended or adjusted under 35 U.S.C. 154(b) by 40 days.

(21) Appl. No.: 16/845,654

(22) Filed: Apr. 10, 2020

(65) Prior Publication Data

US 2021/0319422 A1 Oct. 14, 2021

(51) Int. Cl.
*G06Q 20/20* (2012.01)
*G06Q 20/10* (2012.01)
*G06Q 20/12* (2012.01)
*G06Q 20/18* (2012.01)
*G06Q 20/02* (2012.01)

(52) U.S. Cl.
CPC ....... *G06Q 20/202* (2013.01); *G06Q 20/1085* (2013.01); *G06Q 20/123* (2013.01); *G06Q 20/18* (2013.01); *G06Q 20/027* (2013.01)

(58) Field of Classification Search
CPC ............. G06Q 20/202; G06Q 20/1085; G06Q 20/123; G06Q 20/18; G06Q 20/027
See application file for complete search history.

(56) References Cited

U.S. PATENT DOCUMENTS 9,373,228 B2 * 6/2016 Bentubo ............... G07D 11/009  
2019/0333307 A1 * 10/2019 Grant ..................... G07F 19/205

\* cited by examiner

*Primary Examiner* — A. Hunter Wilder  
*Assistant Examiner* — Joseph M Mutschler  
(74) *Attorney, Agent, or Firm* — Schwegman, Lundberg & Woessner

(57) ABSTRACT

A media terminal includes two integrated currency devices, each device providing at least one feature/operation that is similar to or is the same as the other device. Two independent sessions to each device are made and presented to a transaction application of the terminal as a single aggregated session. When the transaction application issues a command through the single aggregated session, a decision is made that is transparent to the application as to which device should process the command on behalf of the application and the command is issued to the selected device over the corresponding independent session. Results or notifications provided by the selected device are aggregated and provided to the application over the single aggregated session. In an embodiment, the two integrated currency devices are different types of devices from one another.

7 Claims, 5 Drawing Sheets

AGGREGATED SESSION MANAGEMENT FOR TERMINAL DEVICES

BACKGROUND

Currency recyclers, dispensers, deposit only devices, and combined deposit-dispense devices generally include distinguishable features from one another. A recycler is able to receive currency as deposits and provide the received deposits during dispense operations from a single module. A dispenser only supports dispense operations from a single module. A combined deposit-dispense device supports deposits of currency into a first module and dispense operations from a different second module (the deposit funds are not recycled from the first module and available for dispense operations from the second module).

Note capacity and note denominations are two of the main criteria by which banks will differentiate hardware vendors that supply media terminals, such as Automated Teller Machines (ATMs). In short, banks want to know how much currency can be placed in recyclers, dispensers, and deposit-dispense devices from the vendors of an ATM in order to minimize note replenishment costs associated with replenishing notes in the ATM. Other considerations when selecting an ATM vendor include how many different denominations can be offered by the ATM and whether the ATM can support multiple different types of currency.

Some vendors have responded to the requirements of banks with larger note capacity devices associated with media dispense operations, but these devices are: costly to manufacture, complicated, less reliable than existing dispensing-capable devices, and occupy more physical floor space within the banks (which therefore might not comply with disability access government regulations).

Furthermore, multidenominational note cassettes are inherently more complicated and less reliable as notes have to be moved in and out of the cassettes more frequently.

Moreover, when hardware functionality of an ATM is changed, the core ATM application that processes transactions has to change to manage the new functionality. Even through the financial industry includes standardized protocols, the ATM application has to manage a new session for the new hardware functionality. When changes are made to the ATM application, a substantial amount of testing and quality checks have to be performed, since incorrect or failed operations can be costly to the bank and the bank's customers. As a result, banks are typically not interested in solutions that may result in changes to the core ATM application. This further complicates solutions that seek to minimize the frequency of note replenishments within the ATM.

SUMMARY

In various embodiments, methods and a transaction terminal for aggregated session management of integrated devices associated with a transaction terminal, are provided.

In one aspect presented herein, a method of aggregated session management for integrated devices associated with a transaction terminal is provided. A first session is established with a first integrated device of a media terminal having a first integrated device type. A second session is established with a second integrated device of the media terminal having a second integrated device type. A third session is created with a transaction application of the media terminal. A command issued by the transaction application is received over the third session during processing of a transaction on the media terminal. Priorities associated with the first integrated device type and the second integrated device type are evaluated based on the command. The first integrated device is selected based on at least the evaluation of the priorities. The command is issued over the first session to the first integrated device for processing. At least one result associated with processing the command on the first integrated device over the first session is obtained. Then, the result is provided to the transaction application over the third session.

In another aspect presented herein, another method for integrated devices associated with a transaction terminal is presented. A first connection to a first media dispensing device of a media terminal is maintained. A second connection to a second media dispensing device of the media terminal is maintained. A third connection to a transaction application of the media terminal is provided to perform media operations on media associated with the first media dispensing device and the second media dispensing device. A logical dual device is presented to the transaction application over the third connection. A determination as to which of the first media dispensing device or the second media dispensing device is to process the media operations is made based on first interactions with the first media dispensing device over the first connection and second interactions with the second media dispensing device over the second connection. Responses received from the first media dispensing device over the first connection and received from the second media dispensing device over the second connection are combined as a single consolidated response. The consolidated responses are provided to the transaction application over the third connection.

In still another aspect presented herein, a transaction terminal for aggregated session management of integrated devices associated with a transaction terminal is presented. The transaction terminal comprising: one or more processors and a non-transitory computer-readable storage medium, which comprises executable instructions representing a transaction application, a session aggregator, and service providers. The terminal also comprising a first integrated peripheral device and a second integrated peripheral device. The session aggregator when executed by the one or more processors from the non-transitory computer-readable storage medium causes the one or more processors to perform processing comprising: 1) maintaining a first communication session with the first integrated peripheral device using a first service provider; 2) maintaining a second communication session with the second integrated peripheral device using a second service provider; 3) presenting a third service provider as an interface to a logical dual integrated peripheral device over a third communication session, wherein the logical dual integrated peripheral device comprising the first integrated peripheral device and the second integrated peripheral device; 4) processing the valuable media operations received from the transaction application over the third communication session using the third service provider by determining whether to process the valuable media operations on the first integrated peripheral device over the first communication session using the first service provider or whether to process the valuable media operations on the second integrated peripheral device over the second communication session using the second service provider; 5) providing a dual integrated peripheral device status to the transaction application over the third communication session using the third service provider based on selecting between a first integrated peripheral device status from the first integrated peripheral device and a second integrated peripheral device status from the second integrated peripheral device; and 6) providing failover processing for the valuable media operations to the transaction application during transactions processed on the transaction terminal by managing the first integrated peripheral device over the first communication session using the first service provider and by managing the second integrated peripheral device over the second communication session using the second service provider.

DETAILED DESCRIPTION

Figure 1A:
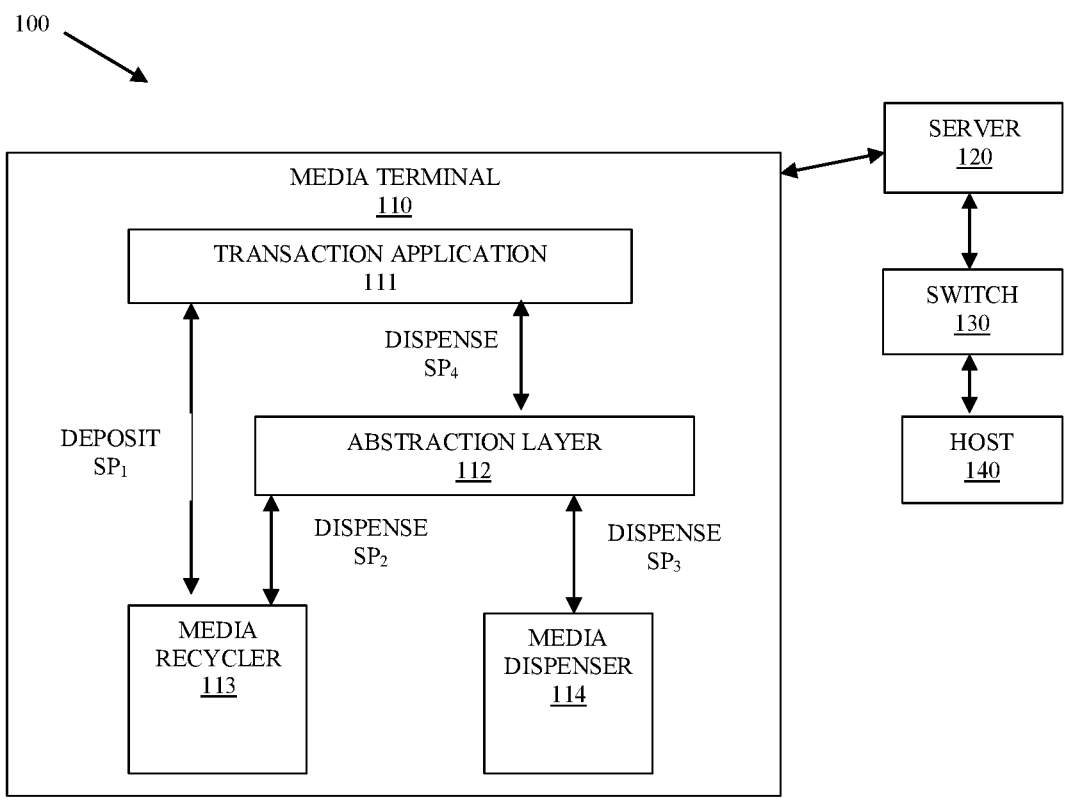
FIG. 1A is a diagram of a system for aggregated session management of integrated devices associated with a transaction terminal, according to an example embodiment.

FIG. 1A is a diagram of a system 100 for aggregated session management of integrated devices associated with a transaction terminal, according to an example embodiment (also referred to as the diverter 103). It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of aggregated session management for integrated devices associated with a transaction terminal, presented herein and below.

As will be discussed more completely herein and below, system 100 permits two integrated peripheral devices of a terminal that share a same capability (such as media dispense capabilities) to be managed and presented to a transaction application of the terminal as a single logical device interfaced with through a single communication session. A state of the single logical device is reported through the single session to the transaction application as a best state available from two devices states of the two devices. Operations directed to the single logical device from the single session are managed based on configured priorities. Any requested operation/command made within the single session only fails when neither of the two devices are capable of performing the operation/command. System 100 processes two separate sessions on behalf of the transaction application, each session directed to interaction with one of the two integrated peripheral devices. The transaction application manages and interacts over a single aggregated session with a single logical device, which is managed by system 100 as two separate sessions associated with each of the two integrated peripheral devices.

System 100 includes media terminal 110, server 120, switch 130, and host 140. Media terminal 100 includes one or more processors, a non-transitory computer-readable storage medium, an integrated media recycler 113, and media dispenser 114. The non-transitory computer-readable storage medium comprising executable instructions representing transaction application 111 and abstraction layer 112. Executable instructions when executed by the one or more processors from the non-transitory computer-readable storage medium cause the one or more processors to perform processing discussed below with respect to transaction application 111 and abstraction layer 112.

System 100 is presented and described within the context of a currency/note dispensing capability of a media terminal 110 for purposes of illustrating and demonstrating the functionality of system 100. However, it is to be noted that other types of integrated peripheral devices and other types of terminals may benefit from the teachings presented herein. Therefore, the present context should not be consider limiting to other foreseeable embodiments of system 100.

Typically, a conventional ATM utilizes an ATM application and a variety of software modules to interact with cash/currency dispensing and depositing devices. These modules provide a connection (a session) to the underlying device drivers of the dispensing and depositing devices. Each session is associated with a particular capability of the corresponding dispensing and depositing devices. The session interaction is provided via a service provider (SP). So, for example, a recycler has two capabilities depositing and dispensing; conventionally, the ATM application requires two SPs and two separate sessions to the recycler: one SP for deposit operations and one SP for dispensing operations. If an additional dispense capability is provided through a second device, then the ATM application has to manage a third SP or session for dispensing operations associated with that second device. This requires the ATM application to pick (decide) between two separate dispensing capable devices associated with two separate independent SPs when a dispense operation is needed during a transaction. This requires the ATM to include additional management logic, more complexity in the existing logic, and correspondingly results in more failed operations. ATM applications are already burdened with a lot of complex logic; as a result, many banks forgo adding multiple dispensing capable devices within their ATMs fearing such an upgrade would be too risky and result in ATM downtimes when customers are unable to be served.

Furthermore, software interactions between the ATM application and the peripheral devices have been largely standardized through the Committee for Standardization (CEN)/Extensions for Financial Services (XFS) (CEN/XFS), which provides a client-server architecture for financial applications on a Windows® Platform especially for interacting with peripheral devices. XFS covers a standard for defining devices classes and interfaces to the corresponding devices, which are accessible through SPs. So, a cash-dispensing device has an interface set of operations defined in accordance with XFS as a Cash Dispensing Module (CDM) for which a SP is available allowing an ATM application to use a CDM with the corresponding SP to interact directly with cash-dispensing capabilities of an interfaced cash-dispensing device. When two peripherals are capable of performing a similar or same capability, two modules are needed, and two SPs are used for the two peripherals.

System 100 includes a new device module in accordance with XFS standards defined as a Dual Dispense Module (DDM). The DDM instance is processed within abstraction layer 112. The DDM (abstraction layer 112) performs a variety of operations including aggregating two separate sessions to two dispensing-capable devices 113 and 114 handled by two separate SPs ($SP_2$ and $SP_3$) into a single aggregated session handled by a single SP ($SP_4$). Transaction application 111 interacts with and processes a single session through $SP_4$. Underlying decisions as to which device (113 or 114) is to be instructed to process a dispense command/operation issued by or through transaction application 111 over $SP_4$ are made by abstract layer 112 (DDM), which means transaction application 111 requires no logic or code modifications beyond instantiating a DDM instance because the sessions ($SP_2$ and $SP_3$) and dispense operation decisions are made by the instantiated DDM instance (abstraction layer 112); rather, transaction application 111 receives status and processes dispense operations over a single session ($SP_4$).

Thus, abstraction layer 112 (DDM): 1) decides which device to process a dispense operation issued by transaction application 111 over the single session ($SP_4$); 2) provides an overall status and available capabilities of two devices 113 and 114 as a single device status and a single set of device capabilities over the single session ($SP_4$) to transaction application 111; 3) prioritizes one device 113 over the other device 114 (based on the types of devices—for example, recycler 113 is favored over dispenser 114 because this would lengthen the media replenishment cycles for terminal 110—decreases the frequency of the media replenishment cycles); 4) performs automatic fail over from a failing device 113 to a non-failing device 114 when the failing device 113 is unable to process a required dispense operation issued by transaction application 111 over the single session ($SP_4$) without burdening or interrupting processing of a transaction or transaction application 111; and 5) exposes through the DDM (abstraction layer 112) a transaction application capability for selection over the single session ($SP_4$) to choose one of the devices 113 or 114 dynamically if required.

Abstraction layer 112 (DDM) is independent of existing SPs, which means the DDM can be processed on different types of devices and different vendors of the devices for a same of similar capability being provided by both the devices 113 and 114. That is, abstraction layer 112 (DDM) is hardware independent and can be processed through any existing SP that instantiated the DDM instance because abstraction layer 111 (DDM) conforms to XFS.

Abstraction layer 112 (DDM) manages the two independent SPs and sessions ($SP_2$ and $SP_3$) relieving transaction application 111 of managing two separate independent sessions to two different devices 113 and 114. Abstraction layer 112 (DDM) aggregates and manages the two separate independent sessions as a single session ($SP_4$) presented to transaction application 111.

System 100 also illustrates that a different capability of a device 113 (such as deposit operations) are handled normally by transaction application 111 through a session ($SP_1$) associated with deposit capabilities.

System 100 provides a number of benefits, such as and by way of example only: 1) exposes the advantages of the underlying hardware of multiple devices 113 and 114 through the abstract layer 112 (DDM) within a single aggregated session ($SP_4$) to transaction application 111 with minimal impact to or modifications being required to transaction application 111; 2) has no impacted on existing deployed hardware associated with integrated devices 113 and 114 (hardware independent) and existing software associated with the deployed hardware; 3) existing replenishment, remote management, diagnostic, and maintenance software is completely unchanged; and 4) there is no requirement to upgrade existing software platforms associated with terminal 110, abstraction layer 112 (DDM) can be applied and instantiated to whatever version of the platform that the enterprise associated with terminal 110 is already running, which minimizes testing cycles.

Abstraction layer 112 (DDM) communicates with existing device-provided SPs using the same interface, which such devices 113 and 114 already provide. This can be done by creating windows to receive events from the existing SPs, consolidating responses from the two devices 113 and 114 and posting the events to transaction application 111.

Abstraction layer 112 (DDM), when receiving a dispense cash operation over the single session ($SP_4$) from transaction application 111 during a transaction, has the flexibility to choose which device (113 or 114) to have process the dispense operation based on configurable priorities assigned to device types associated with the devices 113 and 114. Thus, abstraction layer 112 (DDM) may ask recycler 113 to process the dispense operation over the session associated with $SP_2$, if recycler 113 is unable to dispense the cash based on its current currency levels, DDM asks dispenser 114 over the session associated with $SP_3$ to process the dispense operation. It is only if neither device (113 nor 114) is capable of processing the dispense operation that DDM informs transaction application 111 over the single aggregated session associated with $SP_4$ that a dispense operation was not possible.

In an embodiment, abstraction layer 112 (DDM) provides new and enhanced instructions to transaction application 111 over the single aggregated session. For example, DDM may provide an identifier or position that is being used to dispense currency during a transaction, so that transaction application 111 can direct or alert (such as through lights that are lit) a customer to look for dispensed cash from a designated slot associated with the dispensing device 113 or 114 that processed a dispense operation for the transaction. The new instructions are provided in accordance with the XFS standard. Other additional instructions/features can be provided as well, any new instruction/feature exposed through a SP for the single aggregated session would necessitate modifications in transaction application 111 to know how to process and handle the new instructions/features provided by abstraction layer 112 (DDM).

System 100 allows for failover, such that if one device 113 or 114 is unable to process a given command, the other device 114 or 113 can process the command. Furthermore, in the case of cash-dispensing devices, currency capacity is increased by having two cash-dispensing capable devices 113 and 114 within terminal 110 (both devices 113 and 114 fit in floor space of existing ATMs using existing safes; rather than having to design new safes and floor plans to accommodate a single device with similar dispensing capacity); as a result, replenishment cycles are lengthened for terminal 110 when recycler 113 is used as a primary dispensing device, which frees up space for cash deposits also be processed through recycler 113.

In an embodiment, terminal 110 is an ATM, a Point-Of-Sale (POS) terminal with currency handling capabilities, or a Self-Service Terminal (SST) with currency handling capabilities.

In an embodiment, the integrated peripheral devices 113 and 114 are different types of devices that share a common functionality or similar set of operations for a given functionality.

Figure 1B:
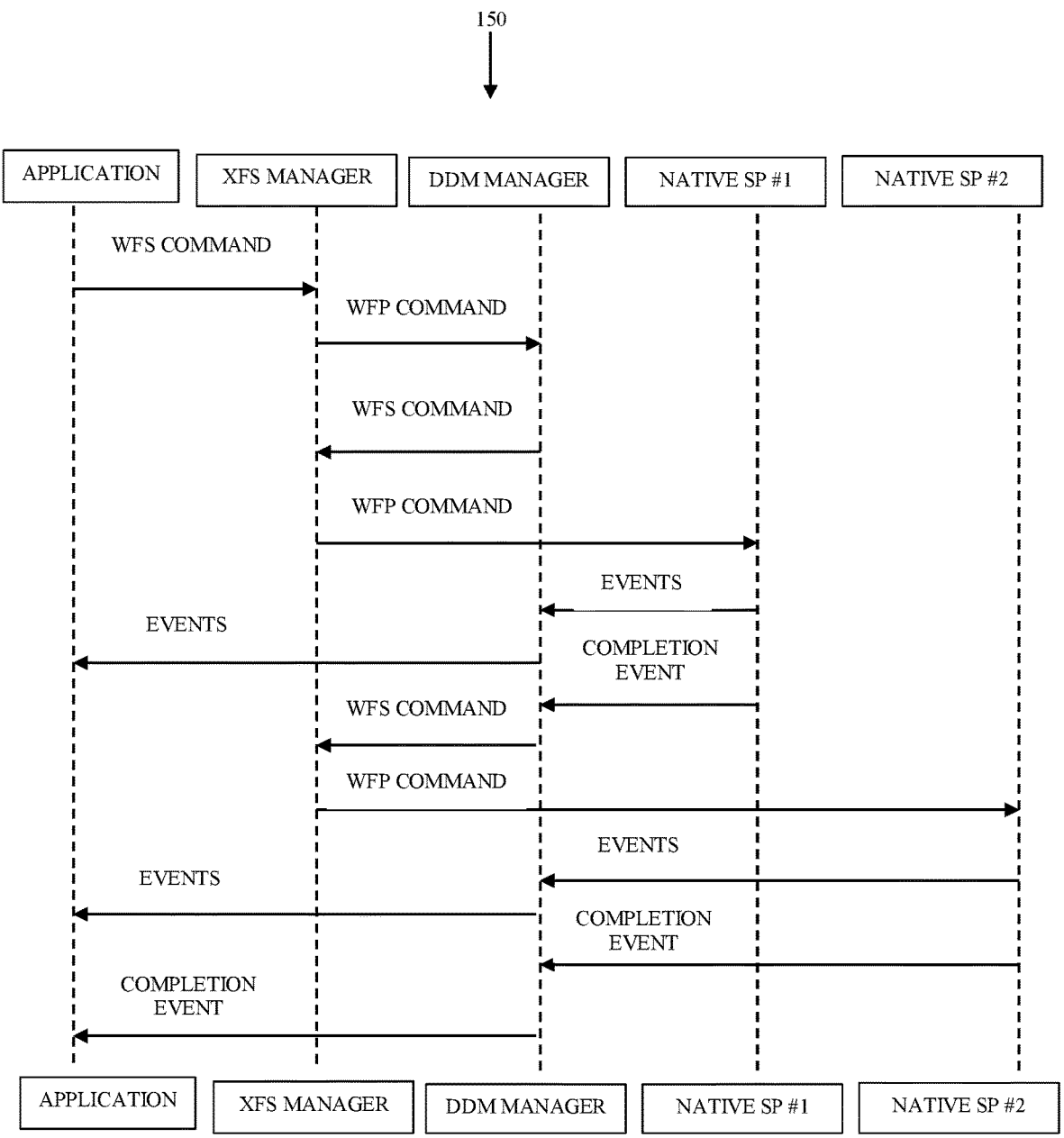
FIG. 1B is a diagram of a method for aggregated session management of integrated devices associated with a transaction terminal, according to an example embodiment.

A process flow of a method associated with system 100 is now discussed within the context of FIG. 1B.

FIG. 1B is a diagram of a method 150 for aggregated session management of integrated devices associated with a transaction terminal, according to an example embodiment. The method 150 comprises a collection of one or more software modules referred to as a "session aggregator." The session aggregator resides on a non-transitory computer-readable storage medium and executed from that medium by at least one hardware processor of a transaction terminal 110. The session aggregator may include one or more network connections comprising: wired networks, wireless networks, and/or a combination of wired and wireless networks.

FIG. 1B illustrates an example implementation that utilizes a number of industry Application Programming Interfaces (APIs), protocols, and software platforms. It is noted that there can be a number of other manners in which the techniques for aggregated session management of integrated devices associated with a transaction terminal, described herein and below, can be implemented, without departing from the teachings presented herein.

The session aggregator is abstract layer 112 (DDM instance that is instantiated on terminal 110).

Transaction application 111 issues a command during a transaction being conducted on terminal 110 as a Web Feature Service (WFS) command to logical dual device associated with a DDM instance for processing by one of at least two devices 113 and 114 available to process the WFS command on terminal 110. The command issued by application 111 requires information from or an operation to be processed by both devices 113 and 114.

An XFS manager that handles WFS commands receives the WFS command and issues an equivalent command (WFP command in FIG. 1B—a command using a native interface recognized and capable of being processed by the corresponding SP) to the DDM instance establishing a single session between application 111 and abstract layer 112 (DDM instance) using $SP_4$.

DDM recognizes two available devices 113 and 114 and issues the command to both through XFS manager as the WFS command. This can be processed asynchronously such that the order in which the first device 113 (native SP #1) and the second device 114 (native SP #2) is called does not have to be serially as depicted in FIG. 1B. It may also be that commands issued from the application 111 are synchronous or asynchronous.

XFS manager translates the XFS command to the corresponding WFP command and sends to device 113. Device 113 processes the WFP command and any events generated are forwarded to DDM. DDM forwards the events to transaction application 111. When device 113 finishes the command a completion event is forwarded to DDM.

These steps are repeated for the second device 114 synchronously or asynchronously.

When processing is completed, DDM through $SP_4$ consolidates the responses from the devices 113 and 114 and posts the completion event to transaction application 111.

It is to be noted that no changes are needed to the software and underlying coding associated with the SPs ($SP_2$ and $SP_3$) that are aggregated via the aggregated session available through $SP_4$. Abstraction layer 112 can be inserted between transaction application 111 and the corresponding devices 113 and 114. Abstraction layer 112 processes, interacts, and utilizes the native and unchanged SPs ($SP_2$ and $SP_3$) and provides a new $SP_4$. This allows system 100 to be easily integrated and deployed on terminal 110 with no changes to the native SPs ($SP_2$ and $SP_3$).

Additionally, the aggregation of interfaces ($SP_2$ and $SP_3$) were described within the context of a similar or same capability being provided by two independent devices 113 and 114. A different capability associated with one of the devices 114 (for deposit operations) remains unchanged and is handled as it normally would be handled by transaction application 111 through $SP_1$. In an embodiment, abstraction layer 112 may aggregate multiple devices' interfaces ($SP_1$, $SP_2$, and $SP_3$) into a single presented interface $SP_4$ or session for multiple different capabilities, such as both deposit and dispense operations.

Furthermore, although abstract layer 112 was discussed in terms of aggregating interfaces for two SPs ($SP_2$ and $SP_3$) into a single aggregated interface or session $SP_4$, abstract layer 112 may aggregate into interface or session $SP_4$ more than two SPs (three or more). The resulting, aggregated interface or session $SP_4$ may aggregate a same or similar capability of three or more devices or may aggregate a same capability and/or different capabilities of three or more devices.

Still further, although devices 113 and 114 are illustrated as media handling devices associated with depositing, recycling, and dispensing media; the system 100 and abstract layer 112 are not so limited. That is, printers, card readers, scanners, and other types of integrated peripheral devices may have their interfaces aggregated by a customized abstraction layer 112 that is customized for the functions provided by the other types of integrated peripherals.

The above-discussed embodiments and other embodiments are now discussed with reference to the FIGS. 2-4.

Figure 2:
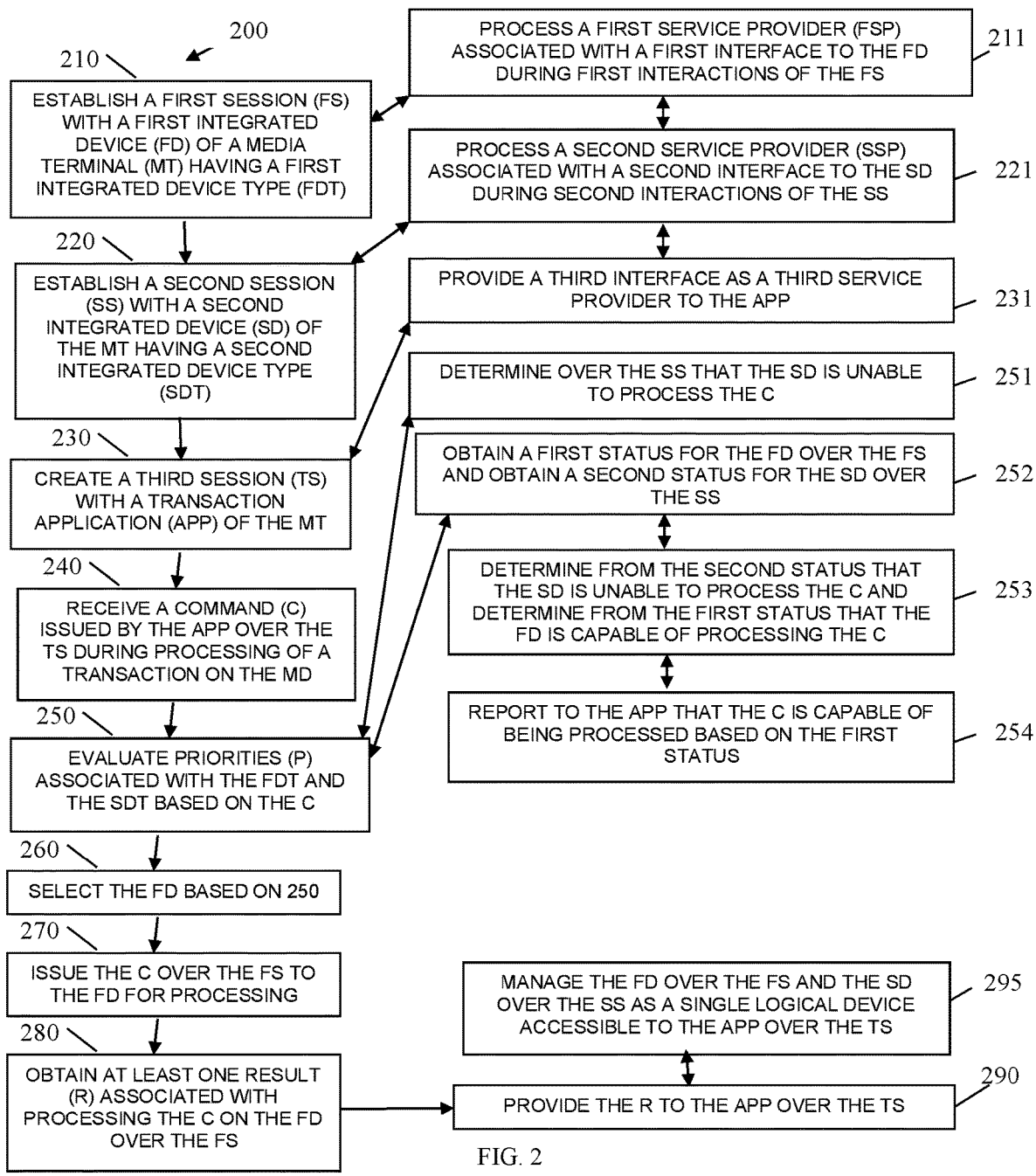
FIG. 2 is a diagram of another method for aggregated session management of integrated devices associated with a transaction terminal, according to an example embodiment.

FIG. 2 is a diagram of another method 200 for aggregated session management of integrated devices associated with a transaction terminal, according to an example embodiment. The method 200 is implemented as firmware/software instructions (referred to as an "integrated device session manager") programmed and loaded into memory from a non-transitory computer-readable storage medium and executed by one or more processors of a transaction terminal. The integrated device session manager may include one or more network connections from the transaction terminal, which may be wired, wireless, or a combination of both wired and wireless.

In an embodiment, the transaction terminal upon which the integrated device session manager is executed is terminal 110. In an embodiment, the terminal 110 is an ATM, an POS terminal that dispenses valuable media, or an SST that dispenses valuable media.

In an embodiment, the integrated device session manager is all of, or some combination of abstraction layer 112 and/or method 150.

At 210, the integrated device session manager establishes a first session with a first integrated device of a valuable media transaction terminal.

In an embodiment, at 211, the integrated device session manager processes a first service provider associated with a first interface of the first integrated device during first interactions with the first integrated device. The first integrated device is of a first integrated device type.

At 220, the integrated device session manager establishes a second session with a second integrated device of the valuable media transaction terminal. The second integrated device is of a second integrated device type.

In an embodiment, the first integrated device type is different from the second integrated device type.

In an embodiment of 211 and 220, at 221, the integrated device session manager processes a second service provider associated with a second interface to the second integrated device during second interactions over the second session.

At 230, the integrated device session manager creates a third session with a transaction application that executes on the valuable media terminal.

In an embodiment of 221 and 230, at 231, the integrated device session manager provides a third interface as a third service provider to the transaction application over the third session.

At 240, the integrated device session manager receives a valuable media command issued by the transaction application over the third session during processing of a transaction by the transaction application on the valuable media terminal.

At 250, the integrated device session manager evaluates priorities associated with the first integrated device type and the second integrated device type.

In an embodiment, at 251, the integrated device session manager determines over the second session that the second integrated device is unable to process the command.

In an embodiment, at 252, the integrated device session manager obtains a first status from the first integrated device over the first session and obtains a second status for the second integrated device over the second session.

In an embodiment of 252 and at 253, the integrated device session manager determines from the second status that the second integrated device is unable to process the command and determines from the first status that the first integrated device is capable of processing the command.

In an embodiment of 253 and at 254, the integrated device session manager reports to the transaction application that the command is capable of being processed based on the first status.

At 260, the integrated device session manager selects the first device based on the evaluation or evaluations processed at 250.

At 270, the integrated device session manager issues the command over the first session to the first integrated device for processing by the first integrated device.

At 280, the integrated device session manager obtains at least one result or at least one response associated with the first integrated device processing the command over the first session.

At 290, the integrated device session manager provides the result or the response to the transaction application over the third session.

In an embodiment, at 295, the integrated device session manager manages the first integrated device over the first session and the second integrated device over the second session as a single logical device accessible to the transaction application over the third session.

Figure 3:
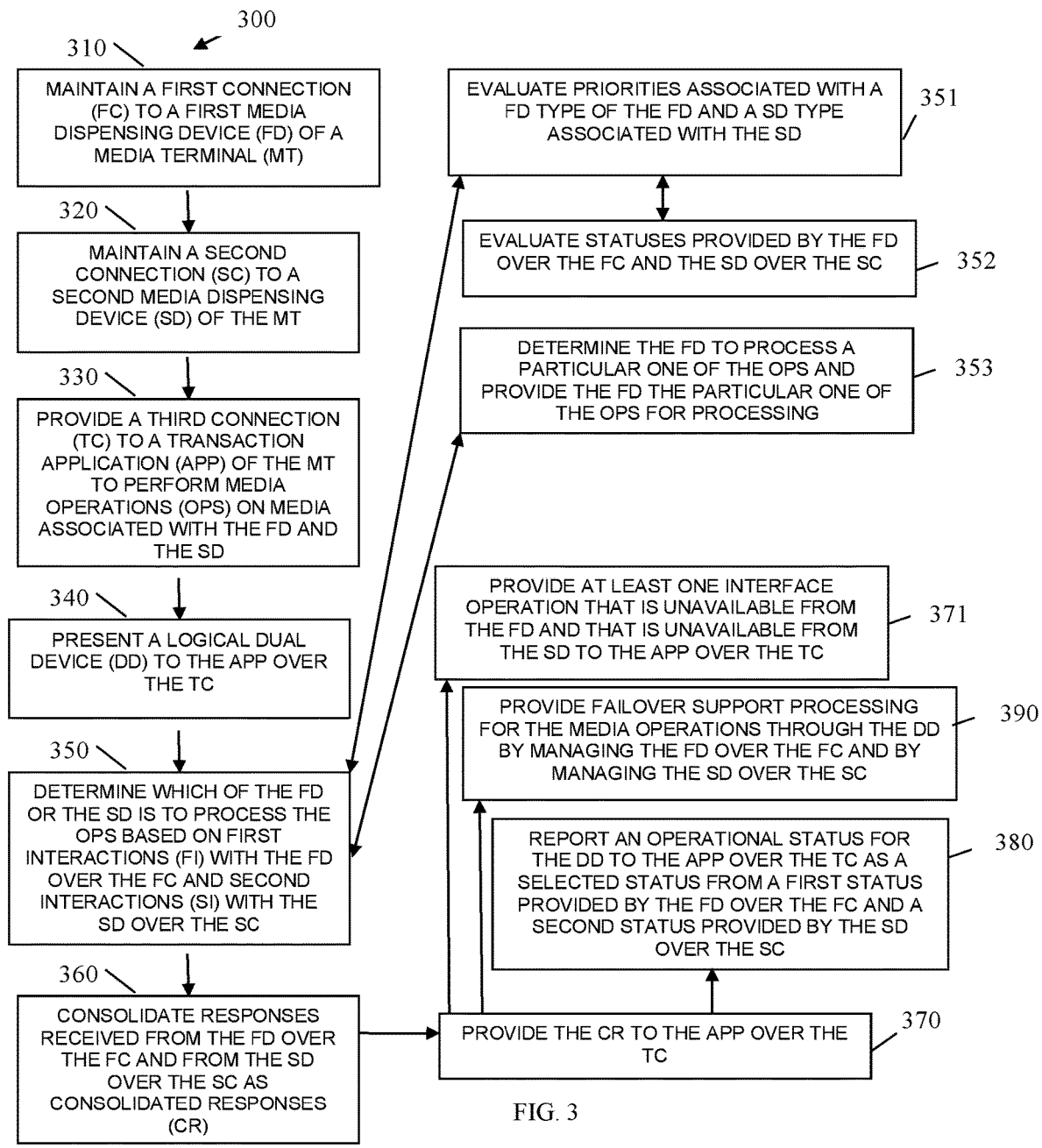
FIG. 3 is a diagram of still another method for aggregated session management of integrated devices associated with a transaction terminal, according to an example embodiment.

FIG. 3 is a diagram of yet another method 300 for aggregated session management of integrated devices associated with a transaction terminal, according to an example embodiment. The method 200 is implemented as firmware/software instructions (referred to as a "valuable-media-dispense session manager") programmed and loaded into memory from a non-transitory computer-readable storage medium and executed by one or more processors of a transaction terminal. The valuable-media-dispense session manager may include one or more network connections from the transaction terminal, which may be wired, wireless, or a combination of both wired and wireless.

In an embodiment, the transaction terminal upon which the valuable-media-dispense session manager is executed is terminal 110. In an embodiment, the terminal 110 is an ATM, an POS terminal that dispenses valuable media, or an SST that dispenses valuable media.

In an embodiment, the valuable-media-dispense session manager is all of, or some combination of abstraction layer 112, method 150, and/or method 200.

The valuable-media-dispense session manager presents another and, in some ways, an enhanced processing perspective of that which was shown in FIG. 2.

At 310, the valuable-media-dispense session manager maintains a first connection to a first media dispensing device of a media terminal.

At 320, the valuable-media-dispense session manager maintains a second connection to a second media dispensing device of the media terminal.

At 330, the valuable-media-dispense session manager provides a third connection to a transaction application of the media terminal for the transaction application to perform media operations on media associated with the first media dispensing device and the second media dispensing device.

At 340, the valuable-media-dispense session manager presents a logical dual device to the transaction application over the third connection.

At 350, the valuable-media-dispense session manager determines which of the first media dispensing device or the second media dispensing device to use for processing the media operations based on first interactions with the first media dispensing device over the first connection and second interactions with the second media dispensing device over the second connection.

In an embodiment, at 351, the valuable-media-dispense session manager evaluates priorities associated with a first media device type of the first media dispensing device and a second media device type associated with the second media dispensing device.

In an embodiment of 351 and at 352, the valuable-media-dispense session manager evaluates statuses provided by the first media dispensing device over the first connection and provided by the second media dispensing device over the second connection.

In an embodiment, at 353, the valuable-media-dispense session manager determines the first media dispensing device to process a particular one of the media operations and provides the first media dispensing device the particular one of the media operations for processing.

At 360, the valuable-media-dispense session manager consolidates responses received from the first media dispensing device over the first connection and from the second media dispensing device over the second connection as consolidated responses.

At 370, the valuable-media-dispense session manager provides the consolidated responses to the transaction application over the third connection.

In an embodiment, at 371, the valuable-media-dispense session manager provides at least one interface operation that is unavailable from the first media dispensing device and that is unavailable from the second media dispensing device to the transaction application. An example of such an operation was discussed above, where the valuable-media-dispense session manager provides a position or identifier that identifies a media dispensing slot on the terminal associated with the dispensing device that processed the command for the transaction application.

In an embodiment, at 380, the valuable-media-dispense session manager reports an operational status for the dual device to the transaction application over the third connection as a selected best status available from a first status provided by the first media dispensing device over the first connection and a second status provided by the second media dispensing device over the second connection.

In an embodiment, at 390, the valuable-media-dispense session manager provides failover support processing for the media operations through the dual device by managing the first media dispensing device over the first connection and by managing the second media dispensing device over the second connection. That is, valuable-media-dispense session manager is capable of processing particular media operations issued by the transaction application during processing of transactions when at least one of the integrated peripheral devices is capable of performing the particular media operations. So, one of the peripheral device may experience a fault (such as a jam) indicating the peripheral device is unavailable, or the peripheral device may be unable to process the operation (such as because media is unavailable to process the operation); in either case, as long as one of the peripheral devices can process any given media operation, the valuable-media dispense session manager is able to perform the operation through the available peripheral device. This provides high-availability and failover processing, which is not managed by and which is transparent to the transaction application.

Figure 4:
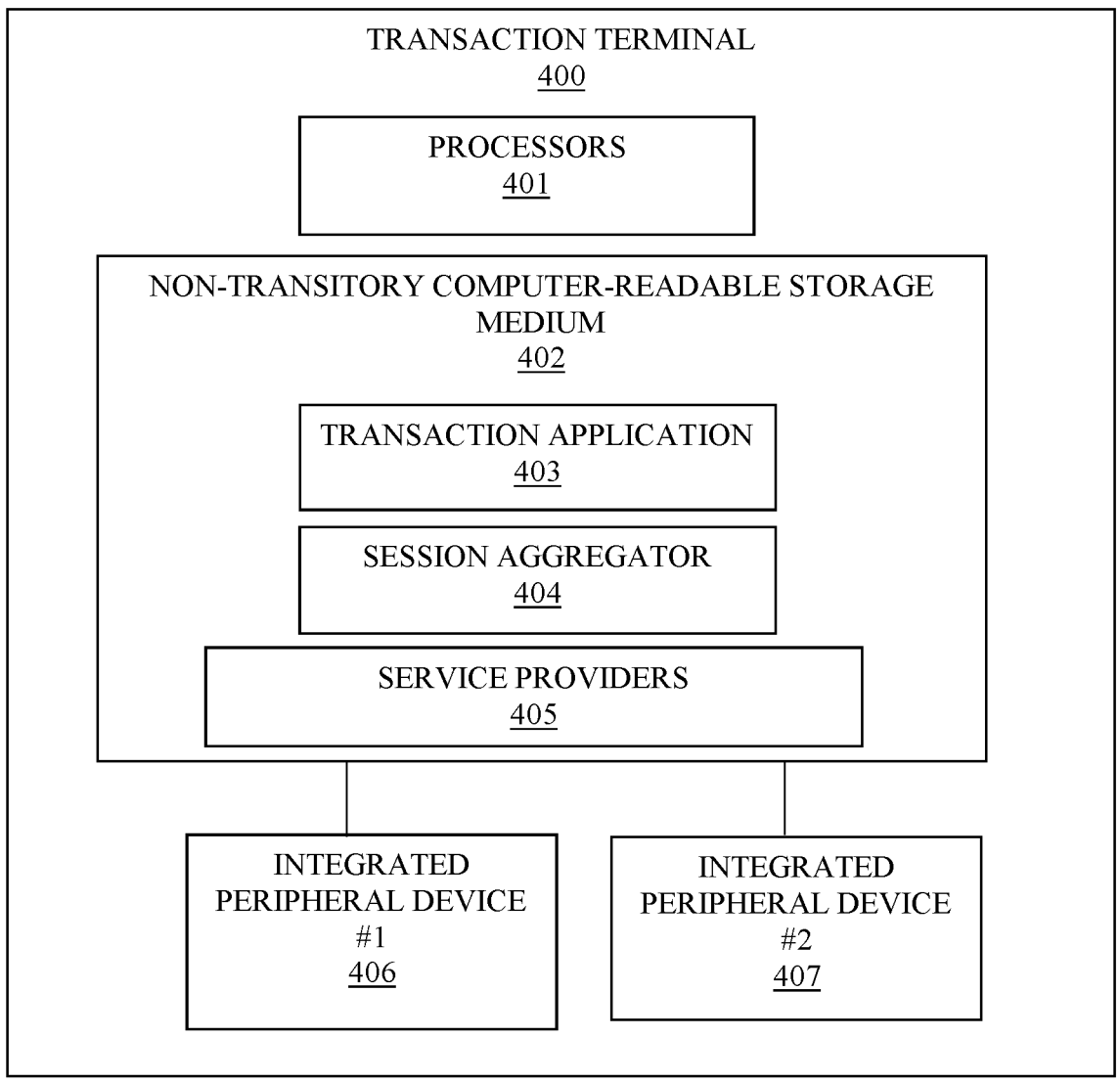
FIG. 4 is a diagram of a transaction terminal for aggregated session management of integrated devices associated with a transaction terminal, according to an example embodiment.

FIG. 4 is a diagram of a transaction terminal 400 for session aggregated management of integrated devices associated with terminal 400, according to an example embodiment. The terminal 400 includes a variety of mechanical, electrical, and software/firmware components, some of which were discussed above with reference to the FIGS. 1A-1B and the FIGS. 2-3.

In an embodiment, the terminal 400 is terminal 110. In an embodiment, terminal 110 is an ATM, a POS terminal, or an SST terminal.

Terminal 400 performs processing described above with FIGS. 1A-1B and FIGS. 2-3.

The terminal 400 includes one or more hardware processors 401 and a non-transitory computer-readable storage medium comprising executable instructions representing a transaction application 403, a session aggregator 404, and service providers 405. The terminal 400 also includes at least two integrated peripheral devices 406 and 407.

The session aggregator 404 when executed by the processor 401 from the non-transitory computer-readable storage medium 402 causes processor 401 to perform processing comprising: 1) maintaining a first communication session with the first integrated peripheral device 406 using a first service provider 405; 2) maintaining a second communication session with the second integrated peripheral device 407 using a second service provider 405; 3) presenting a third service provider 405 as an interface to a logical dual integrated peripheral device over a third communication session, the logical dual integrated peripheral device comprising the first integrated peripheral device 406 and the second integrated peripheral device 407; 4) processing the valuable media operations received from the transaction application 403 over the third communication session using the third service provider 405 by determining whether to process the valuable media operations on the first integrated peripheral device 406 over the first communication session using the first service provider 405 or whether to process the valuable media operations on the second integrated peripheral device 407 over the second communication session using the second service provider 405; 5) providing a dual integrated peripheral device status to the transaction application 403 over the third communication session using the third service provider 405 based on selecting between a first integrated peripheral device status from the first integrated peripheral device 406 and a second integrated peripheral device status from the second integrated peripheral device 407; and 6) providing failover processing for the valuable media operations to the transaction application 403 during transactions processed on the transaction terminal 400 by managing the first integrated peripheral device 406 over the first communication session using the first service provider 405 and by managing the second integrated peripheral device 407 over the second communication session using the second service provider 405.

In an embodiment, the transaction terminal 400 is: an ATM, an SST, or a POS terminal.

In an embodiment, transaction terminal 400 is media terminal 110.

In an embodiment, the first integrated peripheral device 406 is a first type of valuable media device selected from: valuable media recycler, a valuable media dispenser, a valuable media depository, or a combined valuable media depository and recycler device.

In an embodiment of the latter embodiment, the second integrated peripheral device 407 is a second type of valuable media device that is different from the first type of valuable media device of the first integrated peripheral device 406.

In an embodiment, first integrated peripheral device 406 and second integrated peripheral device 407 are a same type of valuable media device.

In an embodiment, first integrated peripheral device 406 and second integrated peripheral device 407 are different types of peripheral devices that share at least one common valuable media handling capability with one another, such as an ability to dispense valuable media.

In an embodiment, first integrated peripheral device 406 is a valuable media recycler and second integrated peripheral device 407 is a valuable media dispenser.

In an embodiment, the session aggregator 404 is all of, or some combination of abstraction layer 112, method 150, method 200, and/or method 300.

In an embodiment, transaction application 403 is transaction application 111.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    maintaining a first connection to a first media dispensing device of a media terminal;
    maintaining a second connection to a second media dispensing device of the media terminal;
    providing a third connection to a transaction application of the media terminal to perform media operations on media associated with the first media dispensing device and the second media dispensing device;

presenting a logical dual device to the transaction application over the third connection;

determining which of the first media dispensing device or the second media dispensing device is to process the media operations based on first interactions with the first media dispensing device over the first connection and second interactions with the second media dispensing device over the second connection;

consolidating responses received from the first media dispensing device over the first connection and from the second media dispensing device over the second connection as consolidated responses; and providing the consolidated responses to the transaction application over the third connection.

2. The method of claim 1 further comprising, reporting an operational status for the logical dual device as a selected status that is selected from a first status provided by the first media dispensing device over the first connection and a second status provided by the second media dispensing device over the second connection.

3. The method of claim 1 further comprising, processing a particular media operation issued by the transaction application when at least one of the first media dispensing device or the second media dispensing device is unable or incapable of processing the particular media operation but a remaining one of the first media dispensing device or the second media dispensing device is capable of processing the corresponding media operation.

4. The method of claim 1, wherein the determining further includes evaluating priorities associated with a first media dispensing device type of the first media dispensing device and a second media dispensing device type of the second media dispensing device.

5. The method of claim 4, wherein evaluating further includes evaluating statuses provided by the first media dispensing device over the first connection and the second media dispensing device over the second connection.

6. The method of claim 1, wherein determining further includes determining the first media dispensing device to process a particular one of the media operations and providing the first media dispensing device the particular one of the media operations for processing.

7. The method of claim 1, wherein providing further includes providing at least one operation that is unavailable to the first media dispensing device and that is unavailable to the second media dispensing device to the transaction application over the third connection.

* * * * *